United States Patent

Van Berkum et al.

[19]

[11] Patent Number: 5,923,747
[45] Date of Patent: *Jul. 13, 1999

[54] COMMUNICATIONS SYSTEM AND INTERFACE CIRCUIT FOR INTERCONNECTING TELEPHONIC SWITCH AND AGENT COMPUTER

[75] Inventors: Paul E. Van Berkum, Geneva; Doug Gisby, Lincolnshire, both of Ill.

[73] Assignee: Rockwell International Corp., Seal Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/720,337

[22] Filed: Sep. 27, 1996

[51] Int. Cl.⁶ .................................................. H04M 3/50
[52] U.S. Cl. ........................... 379/267; 379/265; 379/395
[58] Field of Search .................................... 379/201, 202, 379/203, 204, 205, 206, 260, 261, 262, 263, 264, 265, 267, 395, 88, 67, 89, 88.2, 223; 370/260, 261, 262, 263, 264, 265, 266, 267

[56] References Cited

U.S. PATENT DOCUMENTS

| | | | |
|---|---|---|---|
| 4,627,047 | 12/1986 | Pitroda et al. | 370/384 |
| 4,716,585 | 12/1987 | Tompkins et al. | 370/266 |
| 4,797,910 | 1/1989 | Daudelin | 379/223 |
| 4,922,519 | 5/1990 | Daudelin | 379/223 |
| 4,979,171 | 12/1990 | Ashley | 370/525 |
| 5,001,710 | 3/1991 | Gawrys et al. | 379/265 |
| 5,008,930 | 4/1991 | Gawrys et al. | 379/212 |
| 5,127,004 | 6/1992 | Lenihan et al. | 370/525 |
| 5,157,718 | 10/1992 | Kaplan et al. | 379/223 |
| 5,163,083 | 11/1992 | Dowden et al. | 379/223 |
| 5,181,237 | 1/1993 | Dowden et al. | 379/223 |
| 5,226,077 | 7/1993 | Lynn et al. | 379/395 |
| 5,260,938 | 11/1993 | Hofmann | 379/202 |
| 5,309,504 | 5/1994 | Morganstein | 379/88.2 |
| 5,488,657 | 1/1996 | Lynn et al. | 379/395 |
| 5,526,416 | 6/1996 | Dezonno et al. | 379/265 |
| 5,533,112 | 7/1996 | Danneels | 379/202 |
| 5,535,256 | 7/1996 | Maloney et al. | 379/265 |
| 5,539,741 | 7/1996 | Barraclough et al. | 370/267 |
| 5,544,232 | 8/1996 | Baker et al. | 379/88.25 |
| 5,557,668 | 9/1996 | Brady | 379/265 |
| 5,604,790 | 2/1997 | Grimes | 379/88.2 |
| 5,619,508 | 4/1997 | Davis et al. | 379/93.08 |
| 5,621,789 | 4/1997 | McCalmont et al. | 379/265 |
| 5,625,676 | 4/1997 | Greco et al. | 379/88.2 |
| 5,655,014 | 8/1997 | Walsh et al. | 379/289 |
| 5,655,015 | 8/1997 | Walsh et al. | 379/201 |
| 5,694,467 | 12/1997 | Young, III | 379/267 |
| 5,696,811 | 12/1997 | Maloney et al. | 379/265 |
| 5,712,954 | 1/1998 | Dezonno | 379/266 |

*Primary Examiner*—Scott Wolinsky
*Attorney, Agent, or Firm*—Welsh & Katz, Ltd.

[57] ABSTRACT

An interface circuit 104 provides audio and data communications between a telephonic switch 102 and an agent computer 106. The agent computer 106, telephonic switch 102 and interface circuit 104 are comprised by a communications system 100. The interface circuit 104 includes an integrated circuit 204 for receiving signals from, and transmitting signals to, the telephonic switch 102. A driver circuit 206 interconnects a data interface 200 in an agent terminal 112 to provide data communications from the integrated circuit 204 to the agent computer 106. An audio level control 208 provides audio communications between the integrated circuit 204 and the agent computer 106 and a headset.

20 Claims, 2 Drawing Sheets

5,923,747

COMMUNICATIONS SYSTEM AND INTERFACE CIRCUIT FOR INTERCONNECTING TELEPHONIC SWITCH AND AGENT COMPUTER

BACKGROUND OF THE INVENTION

The present invention relates generally to interface circuits for connecting an agent computer to a telephonic switch and, more particularly, to an interface circuit for interconnecting a telephonic switch and an agent computer wherein the interface circuit provides audio and data communications between the agent computer and the telephonic switch and a communications system for providing audio and data communications between a telephonic switch and an agent computer and an agent.

Telephonic switches are increasingly being used by businesses to automatically route customer telephone calls to available agents. One common type of telephonic switch is an automatic call distributor (ACD) which generally includes a multiport switch controlled by a central processing unit to interconnect the customers and the agents. An example of one such ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

In prior telephone switching systems, agents service telephone calls through an agent console connected to the ACD. The agent console typically consists of an input device, such as a keypad, and a headset including a speaker and a microphone. The agent console thus provides both audio and data communications between the agent and the caller. More and more of the functions previously performed through the agent console are now being implemented via an agent computer. Prior systems have unfortunately not been equipped to provide data and audio communications with agent computers. Therefore, installed systems are unable to fully utilize the call processing capabilities of the agent computer. One such feature is the ability of the agent computer to record, store and play messages from, and to, the caller.

Accordingly, there is a need in the art for an interface circuit for interfacing a telephonic switch and an agent computer which provides audio and data communications to and from the agent computer and a communications systems for providing audio and data communications between a telephonic switch and an agent computer and an agent.

SUMMARY OF THE INVENTION

This need is met by an interface circuit in accordance with the present invention wherein the interface circuit interconnects a telephonic switch and an agent computer to provide audio and data communications between the agent computer and the telephonic switch and a communications system which provides audio and data communications between a telephonic switch and an agent computer and an agent.

In accordance with one aspect of the present invention, an interface circuit interfaces an agent computer associated with an agent and a telephonic switch. The interface circuit comprises switch means for receiving switch audio communications from the telephonic switch, for formatting the switch audio communications for proper receipt by the agent computer, and for transmitting the switch audio communications to the agent computer. Terminal means receives terminal audio communications from the agent computer, formats the terminal audio communications for proper receipt by the telephonic switch, and transmits the terminal audio communications to the telephonic switch.

A central processing circuit in the interface circuit controls the switch means and the terminal means. Preferably, data communications are established between the agent computer and the telephonic switch via data means in the interface circuit. A headset, or agent audio means, provides audio communications with the agent.

In accordance with another aspect of the present invention, a communications system comprises a telephonic switch for routing caller audio communications from a caller, an agent terminal for receiving the caller audio communications and for generating terminal audio communications, and an interface circuit for transmitting the caller audio communications to the agent terminal and for transmitting the terminal audio communications to the caller through the telephonic switch.

These and other features and advantages of the present invention will become apparent from the following detailed description, the accompanying drawings and the appended claims.

DETAILED DESCRIPTION OF THE INVENTION

Figure 1:
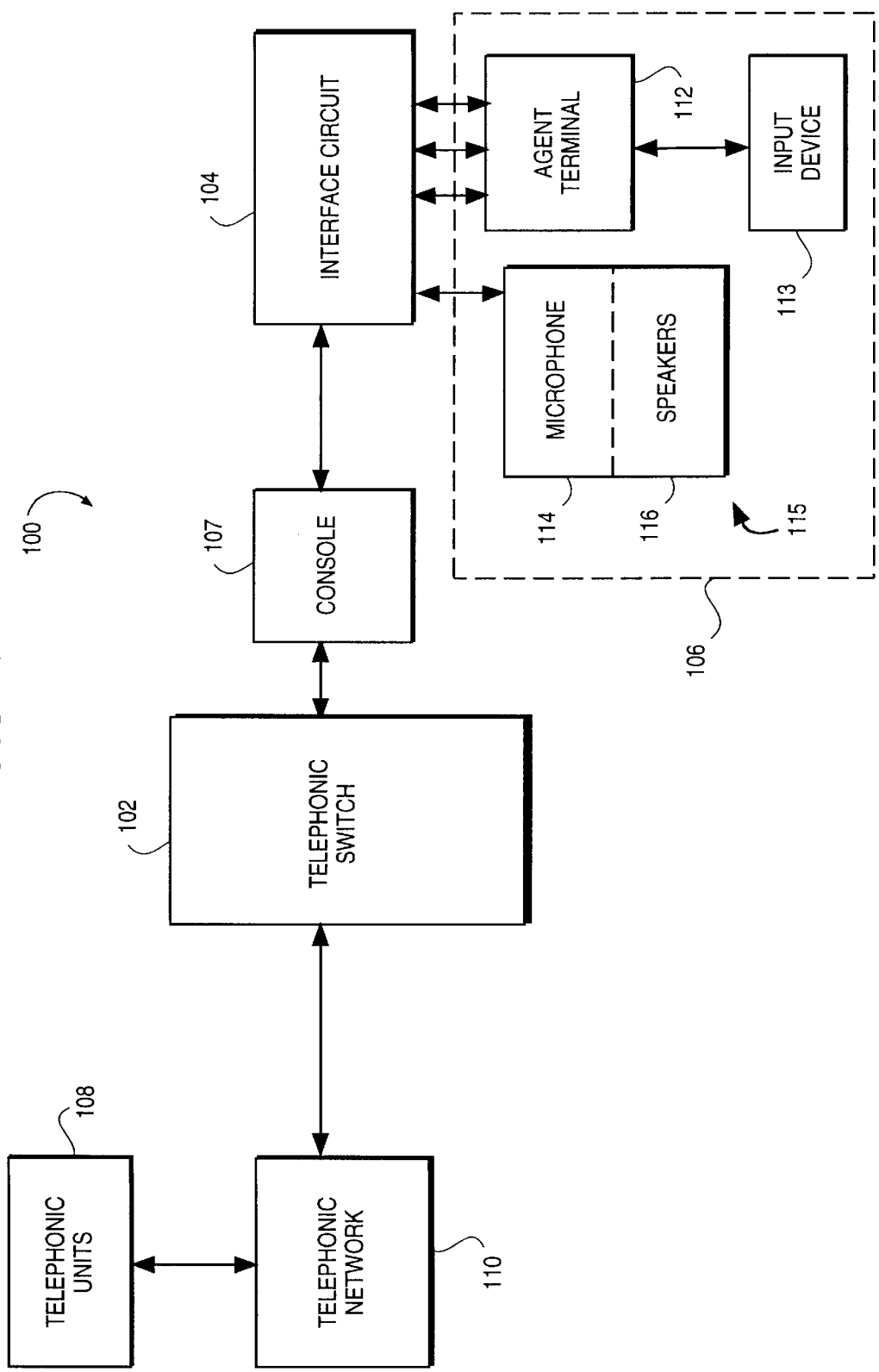
FIG. 1 is a system block diagram of telephonic system containing a communications system and interface circuit in accordance with the present invention.
Figure 2:
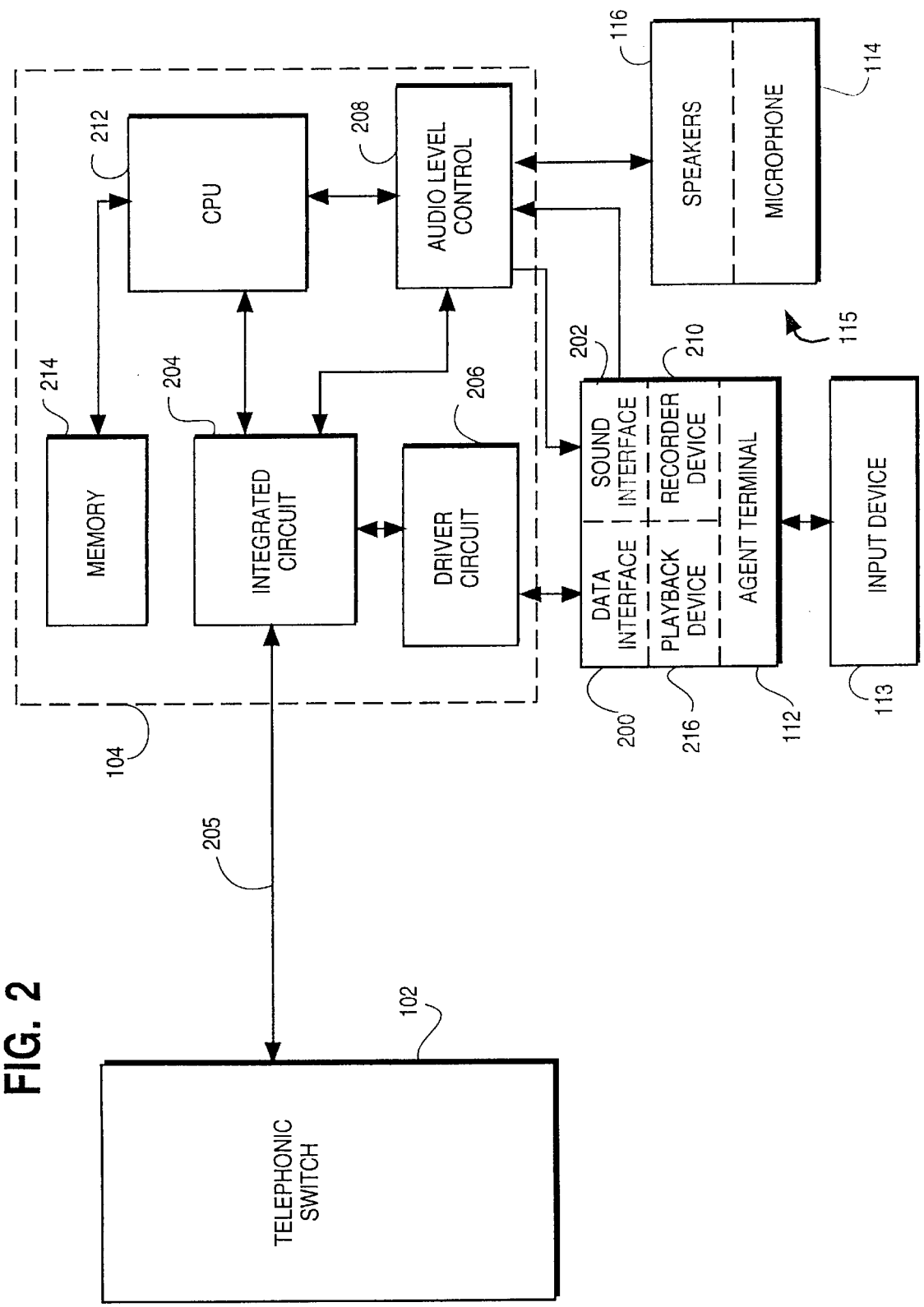
FIG. 2 is a schematic block diagram showing detail of the interface circuit illustrated in FIG. 1.

A communications system 100 in accordance with the present invention is shown in FIG. 1 comprising a telephonic switch 102, an interface circuit 104 and an agent unit 106. Prior systems typically employ a dedicated agent console 107 to communicate with an agent. The agent console 107 consisted of a keypad, a display and a headset. The present invention may be advantageously implemented in prior systems having such a console by connecting the interface circuit 104 to the console 107 (as shown in FIG. 1) or the interface circuit 104 may be directly connected to the telephonic switch 102 (as shown in FIG. 2). The telephonic switch 102 which may be an automatic call distributor (ACD) routes telephone calls generated by callers at telephonic units 108 and transmitted over a telephonic network 110. An example of an ACD which may be advantageously employed in the present invention is disclosed in U.S. Pat. No. 5,140,611 which was previously incorporated by reference herein.

The agent unit 106 is comprised of an agent computer consisting of an agent terminal 112 and an input device 113, such as a keyboard or mouse, for interfacing an agent with the agent computer 112. A data interface 200 and a sound interface 202, both shown in FIG. 2, in the agent terminal 112 provide data and audio communications with the telephonic switch 102. The agent terminal 112 farther includes conventional computing devices, such as one or more microprocessors, memory devices and the like. A headset 115 provides audio communications between the agent and the caller through the telephonic switch 102. The headset 115 typically includes a microphone 114 and one or more speakers 116.

The interface circuit 104 interfaces the agent unit 106 and the telephonic switch 102 or, if present, the console 107. The interface circuit 104 accommodates both audio communications and data communications being transferred from callers through the telephonic switch 102. As shown in greater detail in FIG. 2, the interface circuit 104 includes an integrated circuit 204 for communicating with the telephonic switch 102. Those skilled in the art will readily comprehend that the telephonic switch 102 and the interface circuit 104 may preferably communicate over an integrated services digital network (ISDN).

If the interface circuit 104 is connected to the agent console 107, various connection configurations may be implemented in the present invention. It is contemplated that the interface circuit 104 will be connected to the agent console 107 through the headset connection in the console 107. As those skilled in the art will understand, the headset connection in the agent console 107 may be one of many types. For example, the headset connection may be a conventional 2 wire standard headset interface or a 4 wire standard headset interface. Both the two wire and four wire interfaces can be readily accommodated by the interface circuit 104 of the present invention.

In operation, the switch audio and data communications are transmitted over a link 205, which may be ISDN, to the integrated circuit 204. The integrated circuit 204 routes the data communications to a driver circuit 206 for further transmission to the data interface 200 in the agent terminal 112. The integrated circuit 204 and the driver circuit 206, under the control of a central processing unit (CPU) 212, comprise data means. Those skilled in the art will readily comprehend that the CPU 212 may be comprised of a plurality of logic devices, or a central processing circuit. Preferably, the driver circuit 206 and the agent terminal 112 are connected via a conventional RS232 connection. The transmitted data is used by the agent to access stored data concerning the caller, or the call, and to generate visual displays. A discussion of one such data retrieval, manipulation and display in a telephonic switching system may be found in U.S. Pat. No. 5,479,497 issued to Kovarik on Dec. 26, 1995, entitled "Automatic Call Distributor With Programmable Window Display System And Method", the disclosure of which is hereby incorporated by reference.

For ease of description, audio communications from the telephonic switch 102 will be designated as switch audio communications, or caller audio communications. Audio communications generated by the agent terminal 112 will be designated as terminal audio communications. Finally, voice signals generated by an agent at the microphone 114 will be designated as agent audio communications.

The switch audio communications are sent to an audio level control circuit 208 and transmitted to the sound interface 202 and the speakers 116 of the headset. Accordingly, the voice of the caller is heard by the agent through the headset and may be recorded by a record device 210 in the agent terminal 112. The integrated circuit 204 and the audio level control 208 which are controlled by the CPU 212 comprise switch means for receiving switch audio communications from the telephonic switch, for formatting the switch audio communications for proper receipt by the agent computer, and for transmitting the switch audio communications to the agent computer. The CPU 212 typically operates in accordance with software stored in a memory 214.

The present invention advantageously provides for terminal audio (voice) communications to the caller from a playback device 216, such as a SoundBlaster card manufactured by Creative Labs in the agent computer 106. The agent terminal 112 is programmed to play a stored announcement based on the received data communications or any other characteristics of the call, as desired. The agent may listen to the announcements played by the playback device 216 through the speakers 116. After the appropriate announcements are played, the agent continues the telephone call through the headset in a conventional manner. The integrated circuit 204, under the control of the CPU 212, comprise terminal means for receiving terminal audio communications from the agent unit 106, for formatting the terminal audio communications for proper receipt by the telephonic switch 102, and for transmitting the terminal audio communications to the telephonic switch 102. The microphone 114 and the speakers 116 comprise agent audio means for providing the switch audio communications and the terminal audio communications to the agent.

The structure, control and arrangement of these conventional components and circuits have, for the most part, been illustrated in the drawings by readily understandable block representations and schematic diagrams. The drawings show only those specific details that are pertinent to the present invention in order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. An interface circuit for interfacing an agent computer and an agent headset with a telephonic switch, the interface circuit comprising:

switch means for receiving switch audio communications from the telephonic switch, for formatting the switch audio communications for proper receipt by the agent computer and the agent headset, said switch means having a first output for transmitting the formatted switch audio communications to the agent computer and a second output for transmitting the formatted switch audio communications to the agent headset;

terminal means having a first input for receiving terminal audio communications from the agent computer and a second input for receiving agent audio communications from the agent headset, for formatting the terminal audio communications and agent audio communications for proper receipt by the telephonic switch, and for transmitting the formatted terminal audio communications and agent audio communications to the telephonic switch;

data means for receiving switch data communications of a received call from the telephonic switch, for formatting the switch data communications for proper receipt by the agent computer, and for transmitting the formated switch data communications to the agent computer; and agent audio mean for providing the formatted switch audio communications and the formatted terminal audio communications to the agent headset.

2. The interface circuit as recited in claim 1 further comprising:

a central processing circuit for controlling the switch means, the terminal means, the data and the agent audio means.

3. The interface circuit as recited in claim 1 wherein the data means further comprises: means for transmitting data from the agent computer to the telephonic switch.

4. The interface circuit as recited in claim 1 further comprising; an audio level control circuit for regulating audio levels of the formatted switch audio communications and the formatted terminal audio communications.

5. The interface circuit as recited in claim 4 further comprising:
   a central processing circuit for selectively controlling the audio level control circuit.

6. The interface circuit as recited in claim 1 wherein the agent audio means comprises:
   an audio level control circuit for adjusting signal levels of the formatted switch audio communications and the formatted terminal audio communications provided to the agent headset; and
   a central processing circuit for selectively controlling the audio level control circuit.

7. A communications system comprising:
   a telephonic switch for routing caller audio communications from a caller, and for: transmitting data communications associated with the caller audio communications;
   an agent unit comprising an agent form and an agent headset, the agent unit having a first input connected to the agent terminal for receiving a formatted version of the data communications, a second input connected to the agent terminal for receiving a formatted version of the caller audio communications, a third input connected to the agent headset for providing the caller audio communications to an agent positioned at the agent terminal, a first output for transmitting terminal audio communications from the agent terminal, and a second output for transmitting agent audio communications from the agent headset; and
   an interface circuit inserted between the telephonic switch and the agent unit, the interface circuit for receiving the caller audio communications and the data communications from the telephonic switch, for transmitting the formatted data communications to the first input, for transmitting the formatted caller audio communications to the second and third inputs, for transmitting a formatted version of the terminal audio communications received from the first output to the telephonic switch, for transmitting the formatted terminal audio communications to the third input, and for transmitting a formatted version of the agent audio communications received from the second output to the telephonic switch.

8. The communications system as recited in claim 7 wherein the headset comprises:
   a microphone for generating agent audio communications from the agent and for transmitting the agent audio communications to the interface circuit for transmission to the caller through the telephonic switch.

9. The communications system as recited in claim 7 wherein the interface circuit comprises:
   switch means for receiving the caller audio communications from the telephonic switch, for formatting the caller audio communications for proper receipt by the agent terminal, and for transmitting the caller audio communications to the agent terminal; and
   the terminal means for receiving terminal audio communications from the agent terminal for formatting the terminal audio communications for proper receipt by the telephonic switch, and for transmitting the terminal audio communications to the telephonic switch.

10. The communications system as recited in claim 9 wherein the interface, circuit comprises:
    a central processing circuit for controlling the switch means and the terminal means.

11. The communications system as recited in claim 9 wherein the interface circuit comprises:
    data transmitting means for transmitting data from the telephonic switch to the agent terminal and for transmitting data from the agent terminal to the telephonic switch.

12. The communications system as recited in claim 9 wherein the interface circuit comprises:
    an audio level control circuit for regulating audio levels of the caller audio communications and the terminal audio communications.

13. The communications system as recited in claim 12 wherein the interface circuit comprises:
    a central processing circuit for selectively controlling the audio level control circuit.

14. The communications system as recited in claim 9 wherein the interface circuit comprises:
    agent audio means for providing the caller audio communications and the terminal audio communications to the agent.

15. The communications system as recited in claim 14 wherein the agent audio means comprises:
    an audio level control circuit for adjusting signal levels of the caller audio communications and the terminal audio communications provided to the agent; and
    a central processing circuit for selectively controlling the audio level control circuit.

16. The communications system as recited in claim 7 wherein the interface circuit comprises:
    data means for transmitting data between the telephonic switch and the agent terminal.

17. The communications system as recited in claim 7 wherein the telephonic switch comprises an automatic call distributor.

18. A communications system comprising:
    a telephonic switch for routing caller audio communications from a caller, and for transmitting data communications associated with the caller audio communications;
    an agent computer for receiving a formatted version of the caller audio communications and a formatted version of the data communications, and for transmitting terminal audio communications;
    agent audio means for receiving a formatted version of the caller audio communications and a formatted version of the terminal audio communications, and for transmitting agent audio communications; and
    an interface circuit comprising:
    means for receiving the caller audio communications from the telephonic switch;
    means for formatting the caller audio communications for proper receipt by the agent computer and the agent audio means;
    means for transmitting the formatted caller audio communications to the agent computer via a first output;
    means for transmitting the formatted caller audio communications to the agent audio means via a second output;
    means for receiving the terminal audio communications from the agent computer via a first input;

means for receiving the agent audio communications from the agent audio means via a second input;

means for formatting the terminal audio communications and the agent audio communications for proper receipt by the telephonic switch;

means for transmitting the formatted terminal audio communications and agent audio communications to the telephonic switch; and means for transmitting the formatted terminal audio communications to the agent audio means via the second output.

19. The communication system as recited in claim 18, wherein the interface circuit further comprises:

means for receiving the data communication from the telephonic switch;

means for formatting the data communications for proper receipt by the agent computer; and means for transmitting the formatted data communications to the agent computer via a third output.

20. The communications system as recited in claim 18 wherein the telephonic switch comprises an automatic call distributor.

* * * * *